Figure 1:
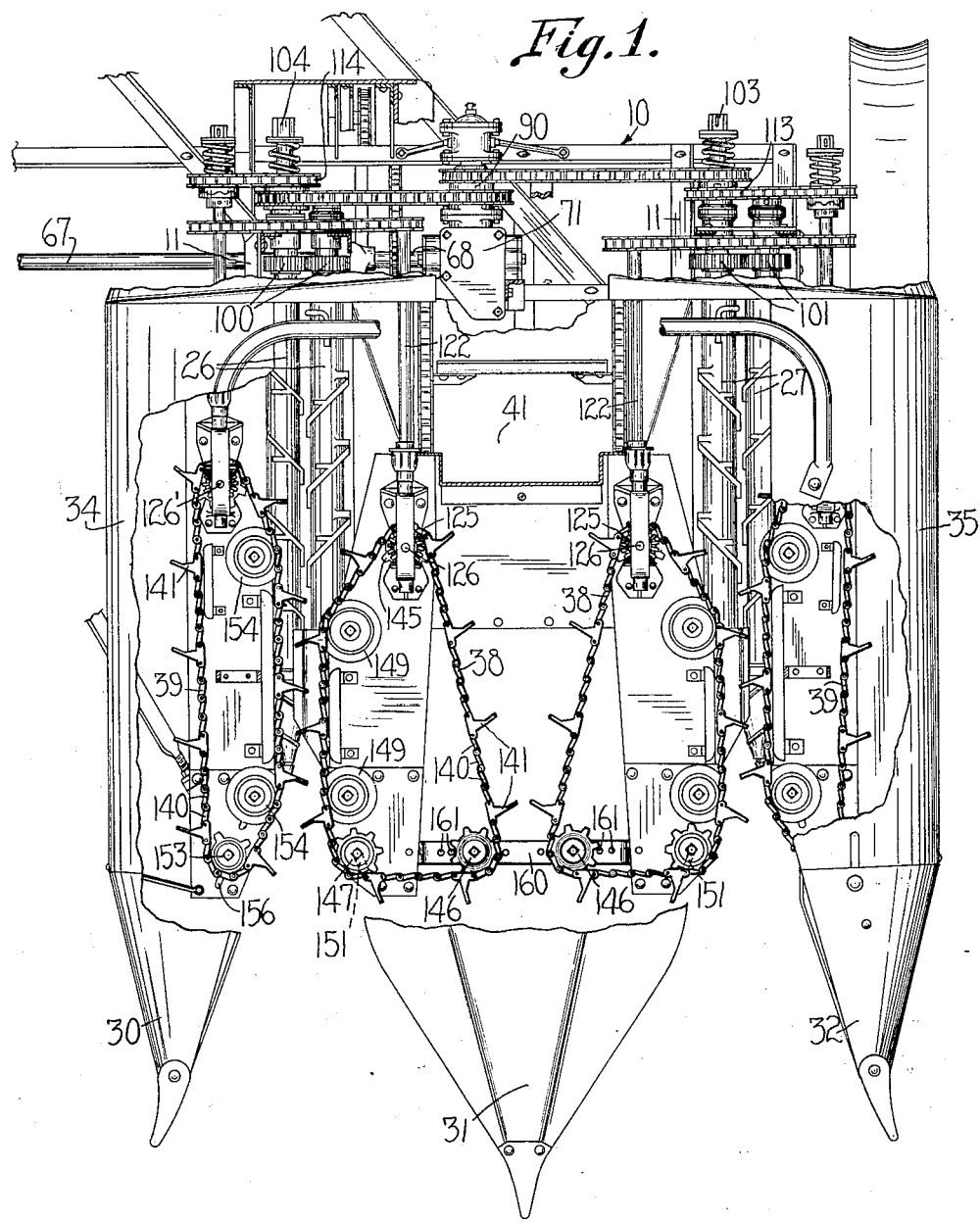

July 30, 1935.  L. A. PARADISE  2,009,514
CORN PICKER
Filed Jan. 13, 1932  2 Sheets-Sheet 1

INVENTOR.
Louis A. Paradise
BY Brown, Jackson
Boettcher + Dienner
ATTORNEYS.

WITNESS
Walter Ackerman

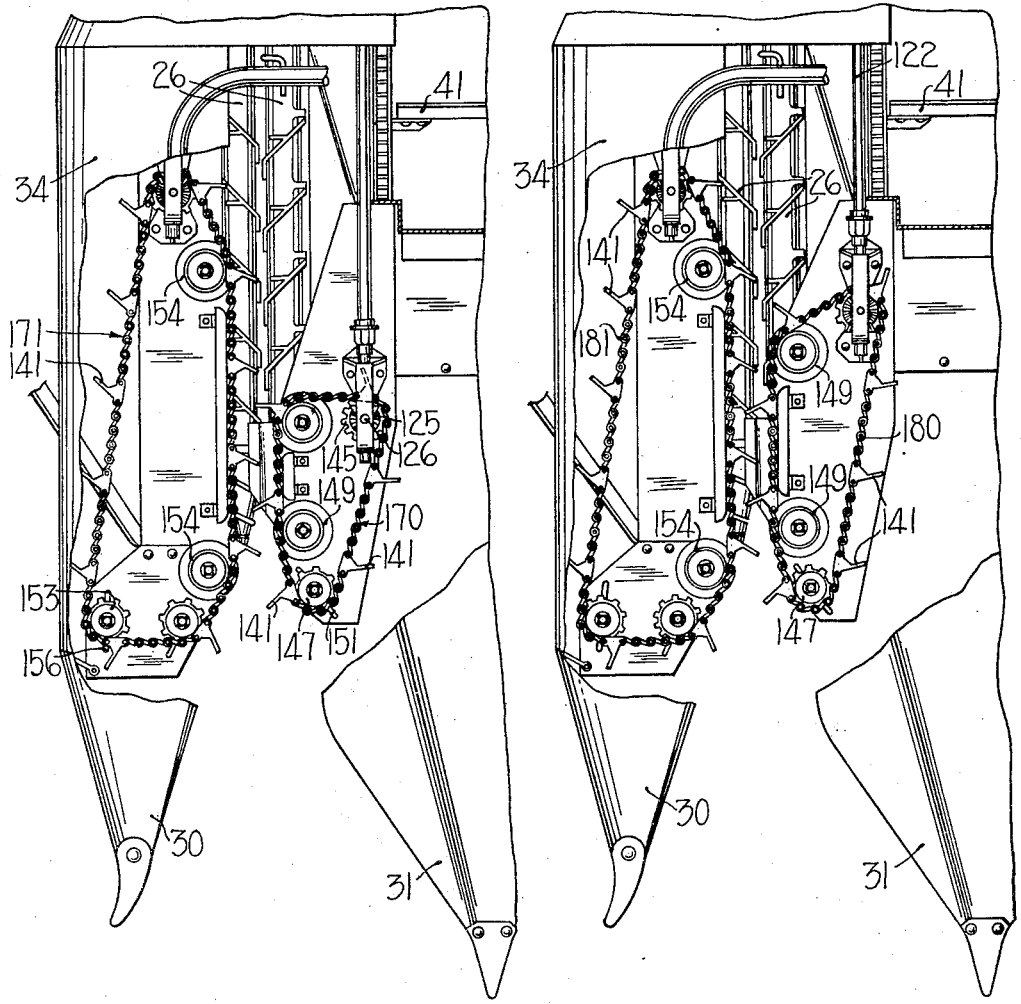

Patented July 30, 1935

2,009,514

UNITED STATES PATENT OFFICE 2,009,514

CORN PICKER

Louis A. Paradise, Moline, Ill., assignor to Deere & Company, Moline, Ill., a corporation of Illinois Application January 13, 1932, Serial No. 586,280

14 Claims. (Cl. 56—106)

The present invention relates generally to corn harvesters of the type including snapping rolls, usually arranged in pairs and adapted to remove ears of corn from standing stalks as the machine traverses the plant row or rows, and suitable gatherer chains or similar means, also generally arranged in pairs, and cooperating to direct the stalks into and through or between the associated snapping rolls.

To facilitate the feeding of the corn stalks in between the snapping rolls the gatherer chains associated with one pair of snapping rolls are usually provided with stalk feeding fingers disposed in spaced apart relation along each chain. The chains operate close together and close to the snapping rolls during one portion of their travel. These fingers or stalk engaging lugs project outwardly from the chain and hence where the chains run close together it is quite desirable to so dispose the lugs that they operate in staggered or alternate relation, that is, the lugs of one chain will be disposed in the space between adjacent lugs on the cooperating chain. It is extremely desirable, therefore, in order to secure the best operation, not only that these lugs should originally be positioned in staggered relation but that this relation be maintained at all times during the life of the machine, notwithstanding the various adjustments which may be necessary from time to time to compensate for the lengthening of the chains due to wear in the links. It is recognized that should these lugs be permitted to come opposite each other any ear of corn which might be caught between them would be crushed, the chain overloaded or some other part of the machine damaged. Should an ear be caught between lugs and the chain overloaded in a machine which is supplied with slip clutch mechanism the drive to the gatherer chain or chains thus overloaded will be interrupted. This necessitates stopping the harvester and clearing out the clogged chains. A machine which damages ears of corn frequently or frequently becomes clogged is not satisfactory.

More specifically it is the principal purpose of the present invention to provide a novel form of gatherer chains and a more or less simplified construction which provides for the convenient adjustment of the lengths of the gatherer chains to compensate for wear, which adjustment can be performed, however, without in any way interfering with or disturbing the proper staggered relation the stalk engaging lugs occupy when feeding the corn stalks to the snapping rolls.

It is generally customary to provide one or more idler gears or sprockets over which these chains are trained and these idler sprockets are shiftably mounted so that as the chain lengthens during the life of the machine the idler gears or sprockets may be shifted to maintain the proper tension in the chains. In one successful form of machine these idler gears or sprockets are shiftably mounted in slots. After the gatherer chains have become worn and all of the adjustment provided for by moving the idler sprockets has been taken up it then becomes necessary in order to further shorten the chains to take out one or more of the links of which the chain is composed. Ordinarily, however, taking out one or more links will disturb the staggered relation so that the stalk engaging lugs will not remain in step or in proper timed relationship. This arises, generally, because the two gatherer chains associated with any one pair of snapping rolls are not of the same length. Where the chains are not of equal length there will not be the same number of fingers or lugs on each chain, and hence if one link is taken out of each chain to adjust the length thereof the chains will not remain in step. By taking out a link from each of the chains the distance between two of the lugs will be shortened and this will occur on each chain, but because one chain is longer than the other the fingers of one chain will progressively advance with respect to the fingers of the other chain so that after a certain number of revolutions of the chains the fingers will be positioned exactly opposite each other. While ordinarily the chains are flexible enough so that the fingers of one chain can pass the fingers of the other chain, even though they are opposite, with the fingers in this position if an ear of corn is engaged by both fingers either the ear will be crushed or the slip clutch mechanism will interrupt the drive to the chains, as pointed out above, which makes it necessary for the operator to stop the harvester and clear out the gatherer mechanism. Where one link is taken from each of two chains of unequal length the amount of progression of lugs or fingers of the shorter chain with respect to the fingers of the other chain will be proportional to the lengths of the chains and the difference between them.

In order to prevent the above described undesirable action, namely, interference between cooperating stalk engaging lugs, the present invention contemplates making the two coacting gatherer chains of each picking device of the same length so that when a link is removed from each chain the staggered relation of the cooperating lugs will not be disturbed whatsoever. The removal of one link from each chain will, of course, shorten the distance between adjacent lugs on each chain, but these shortened sections will always be in proper position if the chains are of the same length.

It is not absolutely essential, however, that the chains be of equal length in order to achieve the desirable results indicated above. The essential feature is that in order to maintain the lugs in proper staggered position after the chains have been shortened by the removal of links therefrom, the number of links removed should be proportional to the lengths of the chains. That is, if the chains are of equal length then the same number of links should be removed from each chain, if one chain is twice as long as the other then one link should be removed from the shorter chain and two links from the longer chain, if one chain is three times as long as the other chain, then the shorter chain should have one link removed therefrom while the longer chain should be shortened by the removal of three links, if one chain is two-thirds as long as the other then two links should be removed from one chain and three links from the other, and so on.

These and other objects and advantages of the present invention will be apparent from the following detailed description of the prepared structural embodiment, taken in conjunction with the accompanying drawings.

In the drawings Figure 1 shows a top view of the picking mechanism of a two-row corn picker with a portion of the shields and the elevator broken away in order to show the disposition and arrangement of the gatherer chains of equal length, Figure 2 shows a construction in which the outer gathering chain is twice as long as the inner chain, and Figure 3 shows the inner gathering chain as being two-thirds as long as the outer chain.

Referring now more particularly to the drawings, the reference numeral 10 indicates in its entirety the supporting frame of the corn harvester which includes forwardly extending frame members 11 supporting, in general, the picking mechanism of the harvester. The picking mechanism of the corn harvester includes two pairs of snapping rolls 26 and 27 suitably journaled in the frame 10 and operating in conjunction with gatherers 30, 31 and 32. The snapping rolls 26 and 27 project downwardly and forwardly and are positioned close together between adjacent gatherers. Outside shields 34 and 35 protect the snapping mechanism, in conjunction with the inside shields (not shown) which are disposed over the adjacent portions of the two picking mechanisms.

In the construction illustrated in Figure 1, suitable inner and outer gatherer chains 38 and 39 are disposed to direct the corn stalks to the snapping rolls 26 and 27. The snapped ears fall onto a common elevator means 41 operatively mounted between the two sets of snapping rolls 26 and 27, this elevator means operating upwardly and rearwardly and serving to convey the ears of corn removed from the stalks to the husking mechanism (not shown) usually, but not necessarily, associated with an agricultural implement of this type.

The mechanism for driving the snapping rolls and the other operating parts of the corn harvester does not, as such, form any part of the present invention excepting so far as driving means for the gatherer chains is thus provided. The reference numeral 67 indicates the transverse drive shaft journaled on the frame 10 of the harvester and driven in any manner desired, either from a bull wheel or from a power take-off shaft, depending upon whether draft animals or a tractor forms the source of draft. The drive shaft 67 is connected with a short shaft 68 rotatably supported in a housing 71 which incloses suitable gearing by which a double sprocket 90 is driven.

The two sets of snapping rolls 26 and 27 are interconnected by spur gearing indicated, respectively, by the reference numerals 100 and 101, these spur gears being secured to the snapping roll shafts in any desired manner. The inner roll of the pair of rolls 27 and the outer roll of the pair of rolls 26 each includes a rearwardly extended shaft portion 103 and 104, respectively, the extension 103 and the extension 104 being both chain connected with the double sprocket 90 to be driven thereby. Additional sprockets 113 and 114 on the extensions 103 and 104 are connected to drive the gatherer chains associated with the snapping rolls, the gatherer chains associated with the snapping rolls 27 on the left hand side of the machine being driven from the sprocket 113. The inner gatherer chain 38 is driven by means of a longitudinally extending shaft 122 connected by bevel gearing 125 which, in turn, drives a vertically disposed shaft 126 carrying a suitable sprocket over which the gatherer chain 38 is trained. If more than one gatherer chain 38 is provided on the inside of the snapping rolls 27 the shaft 126 will be provided with additional sprockets accommodating these chains. The outer gatherer chain 39 associated with the snapping rolls 27 is driven by similar means connected with the shaft 122 by a sprocket and chain construction or the equivalent thereof.

Substantially the same means is driven from the sprocket 114 at the other side of the picker unit for driving the gatherer chains 38 and 39 on the right hand side of the machine and associated with the snapping rolls 26, and hence a further description of these parts is deemed unnecessary.

Referring now more particularly to the construction and arrangement of the gatherer chains shown in Figure 1, it will be observed that each of the gatherer chains 38 and 39 includes a plurality of links 140 and stalk engaging fingers or lugs 141 spaced apart along the chain. In the embodiment illustrated there are four links between each pair of adjacent lugs. As clearly shown in the figure the lugs 141 on the gatherer chain 38 operate in between the corresponding lugs 141 on the gatherer chain 39 during the portions of their travel adjacent the snapping rolls. In order to maintain each gatherer chain in proper position the chain is trained over a plurality of sprockets and rollers.

Referring now particularly to the right hand or inner gatherer chain 38 it will be seen that the same is trained over a driving sprocket 145 fixed to the driving shaft 126, over a pair of idler sprockets 146 and 147, and over a pair of idler rollers 149. The idler sprocket 147 is mounted upon a spindle adjustably positioned in a slot 151. Shifting this idler sprocket in the slot serves to tighten the chain 38. The outer gatherer chain 39 at the right hand side of the machine is similarly supported, at its rear portion, the chain 39 being trained over a driving sprocket carried by the shaft 126′ and over an idler sprocket 153 and a pair of rollers 154. The idler sprocket 153 is similar in all respects to the sprocket 147 associated with the inner gatherer chain 38 and is likewise adjustably mounted in a slot 156 in the forward portion of the harvester frame. The rollers 149 and 154 serve to maintain the stalk engaging portions of the gatherer chains 38 and 39 close together whereby they are effective in directing the stalks of corn in between the snapping rolls 26.

The gatherer chains 38 and 39 at the left hand side of the machine shown in Figure 1 are supported in exactly the same manner as the gatherer chains just described and hence no further description is deemed necessary.

Generally in machines of this type embodying gatherer chains disposed on opposite sides of the snapping rolls it is customary to have the outer gatherer chain longer than the inner chain for various reasons. In conformity with these requirements the corn harvester illustrated is so constructed that the distance between the spindle of the idler gear 153 and the shaft 126' is greater than the distance between the spindle of the idler gear 147 and the shaft 126. In machines of the prior art embodying this feature the inner gatherer chain 38, being shorter, extended directly from the sprocket corresponding to sprocket 145 to the idler sprocket corresponding to sprocket 147. As stated above, however, the construction illustrated in Figure 1 preferably provides inner and outer gatherer chains of equal length, and in order to accommodate this arrangement the additional idler sprocket 146 is provided. These sprockets are rotatably mounted upon a central transversely extending supporting bracket 160, and if desired these sprockets may be adjustably secured thereto, the bracket 160 being provided, for example, with a plurality of openings 161 accommodating different positions of the idler sprockets. Thus, an adjusting means additional to the slots 151 is provided for the inner gatherer chains and may be used where adjustment is necessary only for these chains. When both the inner and outer gatherer chains so wear that one or more links must be removed in order to operate the chains under the proper tension, the present construction in which the gatherer chains are of equal length is especially advantageous. By removing the same number of links from each chain all of the chains can be shortened as required without in any way disturbing the staggered arrangement of the stalk engaging lugs which coact to direct the stalks in proper position to the snapping rolls.

While in most implements the construction in which the gatherer chains are of the same length is preferable, this particular construction is not essential. For example, the present invention contemplates making one chain exactly half as long as the companion chain, in which case the same staggered or in step relationship of the lugs would be maintained if, whenever one link is removed from the shorter chain, two links, preferably at diametrically opposite sides, are removed from the other chain. As previously pointed out, the relationship between the number of links removed from the two chains is exactly equal to the relationship between the lengths of the two chains. In its broader aspects it will therefore be seen that the present invention contemplates the provision of companion gatherer chains wherein the permissive adjustments of the length of the chains are in direct proportion to the lengths of the chains. In other words, where the chains are of the same length the same amount of adjustment is made in each chain, and if one chain is some fractional part of the length of the other chain the adjustment of the shorter chain must bear the same proportion to the corresponding adjustment of the longer chain as the proportion between the lengths of the chains.

This is the construction illustrated in Figure 2 in which the inner gathering chain is only one-half as long as the outer gathering chain. Referring now to Figure 2, it will be seen that the same driving arrangement shown in Figure 1 is utilized, with the exception that the adjustable idler sprocket 146 has been omitted. In this case the shorter and inner gathering chain, indicated by the reference numeral 170 is made up of six gathering lugs, separated by five links, while the outer gathering chain 171, being twice as long as the inner gathering chain 170, comprises twelve gathering lugs 141. Since the chain 170 is only one-half as long as the chain 171, the gathering lugs 141 are maintained in the proper staggered relation during any adjustment of the machine for wear of the links by taking out two links from the chain 171 whenever one link is taken out of the chain 170. Thus, the proper relation between the gathering lugs is maintained if the respective chains are adjusted to an extent which is proportional to their lengths. This, as will be obvious, is the natural adjustment, since the longer the chain, the greater will be the total amount of adjustment to accommodate wear in the greater number of links. While, as described, the gatherer chains may be either of the same length or one may be of a length which is multiple of the lengths of the other chain, these particular relations are, of course, not essential. For example, one chain may be two-thirds as long as the other, in which case adjustment can be effected by removing two links from the shorter chain and three links from the longer chain, preferably these links being removed from uniformly spaced points along the chain. It is to be noted in this connection that in both cases the distance between the points, or the number of links between these points, is the same in both chains. In other words, each chain comprises a plurality of links arranged in units of so many links in each unit, with each chain containing a whole number of such units. This, of course, presupposes a chain construction in which only complete links can be removed. If a chain construction is employed in which, for example, a fractional part of a link can be removed then the above stated proportions are similarly modified.

Figure 3 illustrates the construction in which one of the gathering chains is two-thirds as long as the other, and referring now to Figure 3, the inner gathering chain 180 is shown as supported and driven in practically the same manner and by the same means as the previously described construction. This inner gatherer chain 180 consists of eight gathering lugs 141. The outer gathering chain 181 is likewise supported in a manner and driven by the same means as described previously, and this chain consists of twelve gathering lugs 141, this chain being, for all practical purposes, identical with the chain 171 shown in Figure 2. As mentioned above, in order to keep the gathering lugs in their proper staggered relationship, when the lengths of these chains 180 and 181 are to be adjusted, two links can be removed form the inner chain 180 and three links can be removed from the outer chain 181. Of course, and this applies to the previously described modifications as well, if a greater extent of adjustment than is thus afforded is required, multiples of these numbers of links may be removed. It is to be noted, however, that in most machines the usual adjustable sprockets for supporting the same are generally of such construction that, for practical considerations, not more than three links can be removed from either chain, and the constructions shown illustrate the principles of the present invention as applied to implements of this kind. While it is preferable when removing a number of links, to remove them at uniformly spaced points, it is not absolutely essential to do so since the chains would remain in step even though all of the removed links were taken out from one point.

While I have shown and described the preferred structural embodiment it is to be understood that the present invention is not to be limited to the specific means shown and described, but that, in fact, widely different means may be employed in the practice of the broader aspects of the invention as defined by the appended claims.

What I claim, therefore, and desire to secure by Letters Patent, is:

1. In an agricultural implement, inner and outer gatherer frames, operating mechanism associated therewith, inner and outer gatherer chains cooperating with said mechanism to direct plants thereto, a pair of spaced sprockets carried by one of said gatherer frames for supporting the associated gatherer chain, a second pair of sprockets for the other gatherer chain carried by the gatherer frame and spaced closer together than said first pair of sprockets, and an idler sprocket associated with said second pair of sprockets and spaced therefrom to provide a circuit for said other gatherer chain equal in length to the circuit for said first gatherer chain.

2. In an agricultural implement, inner and outer gatherer frames, a pair of snapping rolls journaled thereon, inner and outer gatherer chains cooperating with said rolls to direct stalks thereto, a pair of spaced sprockets carried by one of said gatherer frames for supporting the associated gatherer chain, a second pair of sprockets for the other gatherer chain carried by the gatherer frame and spaced closer together than said first pair of sprockets, and an idler sprocket associated with said second pair of sprockets and spaced therefrom to provide a circuit for said other gatherer chain equal in length to the circuit for said first gatherer chain.

3. In an agricultural implement, inner and outer gatherer frames, a pair of snapping rolls journaled thereon, inner and outer gatherer chains cooperating with said rolls to direct stalks thereto, a pair of spaced sprockets carried by the outer gatherer frame for supporting the outer gatherer chain, a second pair of sprockets for the inner gatherer chain carried by the other gatherer frame and spaced closer together than the outer pair of sprockets, and an idler sprocket associated with the inner pair of sprockets and spaced therefrom to provide a circuit for the inner gatherer chain equal in length to the circuit for the outer gatherer chain.

4. In an agricultural implement having two spaced snapping units, each unit including inner and outer gatherer frames, a pair of snapping rolls journaled on each set of inner and outer gatherer frames, outer gatherer chains supported by the outer gatherer frames, inner gatherer chains carried by the inner gatherer frames and disposed adjacent one another, said gatherer chains cooperating with said rolls to direct stalks thereto, a pair of spaced sprockets carried by the outer gatherer frames for supporting the associated gatherer chain, a pair of inner sprockets carried by each of the inner gatherer frames for supporting the inner gatherer chains, the sprockets of each inner pair being spaced closer together than the sprockets of the outer pairs, and a pair of idler sprockets, at least one of which is adjustable and both being carried by the inner gatherer frame and spaced from the associated inner pair of sprockets to provide a circuit for the inner gatherer chain equal in length to the circuit for the outer gatherer chain associated therewith.

5. In an agricultural implement having two spaced snapping units, each unit including inner and outer gatherer frames, a pair of snapping rolls journaled on each set of inner and outer gatherer frames, outer gatherer chains supported by the outer gatherer frames, inner gatherer chains carried by the inner gatherer frames and disposed adjacent one another, said gatherer chains cooperating with said rolls to direct stalks thereto, a pair of spaced sprockets carried by the outer gatherer frames for supporting the associated gatherer chain, a pair of inner sprockets carried by each of the inner gatherer frames for supporting the inner gatherer chains, the sprockets of each inner pair being spaced closer together than the sprockets of the outer pairs, and a pair of idlers, one mounted on the associated inner gatherer frame and spaced from the associated inner pair of sprockets to provide a circuit for the inner gatherer chain equal in length to the circuit for the associated outer gatherer chain, the other idler being mounted on the outer gatherer frame, and both idlers being adjustable to provide for the removal of the same number of links from the inner and outer gatherer chains.

6. In an agricultural implement, a supporting frame, two pairs of snapping rolls, inner and outer gatherer chains cooperating with said rolls to direct stalks thereto, a pair of spaced sprockets carried by said frame for supporting each gatherer chain, the sprockets supporting the inner gatherer chains being spaced closer together than the sprockets supporting the outer gatherer chains, an idler sprocket associated with said closely spaced pairs of sprockets to provide circuits for the inner gatherer chains equal in length to the circuits provided for the outer gatherer chains, and a common elevator means operating between said pairs of snapping rolls and adapted to receive ears of corn from both pairs of rolls above the more closely spaced inner sprockets.

7. In an agricultural implement, a supporting frame, two pairs of snapping rolls, inner and outer gatherer chains cooperating with each pair of rolls to direct stalks thereto, a pair of spaced sprockets carried by said frame for supporting each of the outer gatherer chains, a second pair of sprockets disposed adjacent one another and adapted to support each of the inner gatherer chains, said second pair of sprockets being spaced closer together than the first pair of sprockets, an idler sprocket associated with each of the closely spaced inner pairs of sprockets, said idler sprockets being disposed adjacent the lower inner sprockets and the lower supporting sprockets being disposed substantially opposite the lower sprocket of the outer pairs of sprockets, and a common elevator means operating between said pairs of snapping rolls and adapted to receive ears of corn from said snapping rolls from points above the upper sprockets of said inner pairs of sprockets.

8. In an agricultural implement, a supporting frame, two pairs of snapping rolls, a pair of inner and outer gatherer chains cooperating with each pair of snapping rolls to direct stalks thereto, a pair of outer supporting sprockets for each of the outer gatherer chains, a pair of inner supporting sprockets for each of the inner gatherer chains, the inner supporting sprockets being spaced closer together than the sprockets for the outer gatherer chains and the upper inner sprockets being disposed below the upper sprockets of the outer pairs of sprockets, an idler sprocket disposed adjacent each of the lower inner sprockets and adjustably mounted on said frame, each idler sprocket providing, in connection with the associated pair of inner supporting sprockets, a circuit for the inner gatherer chain substantially equal in length to the circuit for the associated outer gatherer chain, and common elevator means operating between said pairs of snapping rolls and adapted to receive ears of corn therefrom at points above the upper inner supporting sprockets.

9. In an agricultural implement, two sets of inner and outer gatherer frames, two pairs of snapping rolls journaled thereon, inner and outer gatherer chains cooperating with each pair of snapping rolls to direct stalks thereto, a pair of spaced sprockets carried by each of the outer gatherer frames for supporting the outer gatherer chains, a pair of inner sprockets carried by each of the inner gatherer frames and adapted to support the inner gatherer chains, the sprockets of the inner pairs being spaced closer together than the sprockets of the outer pairs, a transverse bar connecting the front portions of the inner gatherer frames, and idler sprockets adjustably mounted thereon, each of said idler sprockets cooperating with one of the inner pairs of sprockets to provide a circuit for each of the inner gatherer chains which is equal in length to the circuit for the associated outer gatherer chain.

10. In an agricultural implement, inner and outer gatherer frames, snapping roll means journaled thereon, inner and outer gatherer chains cooperating with said roll means to direct stalks thereto, each chain being provided with spaced stalk feeding means thereon and the stalk feeding means of one chain being adapted to operate in between the stalk feeding means of the other chain, a pair of spaced sprockets carried by the outer gatherer frame for supporting the outer gatherer chain, a second pair of sprockets for the inner gatherer chain carried by the other gatherer frame, and means associated with one pair of said sprockets to provide a circuit for the gatherer chain supported thereby so that the length of the latter will be equal to the length of the other gatherer chain multiplied by a whole number.

11. In an agricultural implement, inner and outer gatherer frames, a pair of snapping rolls journaled thereon, inner and outer gatherer chains cooperating with said rolls to direct stalks thereto, a pair of spaced sprockets carried by the outer gatherer frame for supporting the outer gatherer chain, a second pair of sprockets for the inner gatherer chain carried by the other gatherer frame and spaced closer together than the outer pair of sprockets, an idler sprocket associated with one pair of sprockets and spaced therefrom to provide a circuit for one gatherer chain the length of which is equal to the length of the other gatherer chain multiplied by a whole number.

12. In a row crop harvesting implement, harvesting mechanism, inner and outer gatherer frames, inner and outer endless gatherer chains mounted on said frames, respectively, a pair of spaced sprockets carried by the outer gatherer frame for supporting the outer gatherer chain, a second pair of sprockets for the inner gatherer chain carried by the other gatherer frame, said chains being disposed in substantially the same plane and comprising a series of links, certain of said links having projecting fingers, the fingers on one chain being positioned in a definite position with respect to the fingers on the other chain, means for driving said chains at the same linear velocity with adjacent sides running in the direction towards said harvesting mechanism to direct crop thereto, and supporting means for each of said chains, each supporting means including a movable part adjustably shiftable to an extent sufficient to provide for the removal of a number of links from the associated chain, so that the number of links removable from one chain bears the same relation to the number of links removable from the other chain as the length of said one chain bears to the length of the other chain.

13. In a row crop harvesting implement, harvesting mechanism, inner and outer gatherer frames, inner and outer endless gatherer chains mounted on said frames, respectively, a pair of spaced sprockets carried by the outer gatherer frame for supporting the outer gatherer chain, a second pair of sprockets for the inner gatherer chain carried by the other gatherer frame, said chains being disposed in substantially the same plane and each comprising a series of links, certain of said links having projecting fingers, the fingers on one chain being positioned in a definite position with respect to the fingers on the other chain, means for driving said chains at the same linear velocity with adjacent sides running in the direction towards said harvesting mechanism to direct crop thereto, and an idler mounted on one of said frames and associated with the pair of sprockets thereon to provide a circuit for one gatherer chain the length of which is equal to the length of the other gatherer chain multiplied by a multiplier, neither the numerator nor the denominator of which is greater than 3.

14. In a row crop harvesting implement, harvesting mechanism, inner and outer gatherer frames, inner and outer endless gatherer chains mounted on said frames, respectively, a pair of spaced sprockets carried by the outer gatherer frame for supporting the outer gatherer chain, a second pair of sprockets for the inner gatherer chain carried by the other gatherer frame, said chains being disposed in substantially the same plane and each comprising a series of links, certain of said links having projecting fingers, the fingers on one chain being positioned in a definite position with respect to the fingers on the other chain, means for driving said chains at the same linear velocity with adjacent sides running in the direction towards said harvesting mechanism to direct crop thereto, an idler mounted on one of said frames and associated with the pair of sprockets thereon to provide a circuit for one gatherer chain the length of which is equal to the length of the other gatherer chain multiplied by a multiplier, neither the numerator nor the denominator of which is greater than 3, and means for tensioning each of said chains, the means for tensioning said one chain providing for shortening said one chain by at least the number of links equal to the numerator of said multiplier and the means for tensioning the other chain providing for shortening said other chain by at least the number of links equal to the denominator of said multiplier, whereby said chains may be shortened without causing the definite position of the fingers on one chain with respect to the fingers on the other chain to be affected as said chains are driven, by thus removing the number of links equal to the numerator of said multiplier from said one chain and removing the number of links equal to the denominator of said multiplier from said other chain.

LOUIS A. PARADISE.